(12) United States Patent
Blank et al.

(10) Patent No.: US 6,921,549 B2
(45) Date of Patent: Jul. 26, 2005

(54) PROFICIENCY BEVERAGE

(76) Inventors: Arthur G Blank, 19 Woodview Dr., Doylestown, PA (US) 18901; Steven Scutt, 1 Redwell Ave., Essendon, Mertroxeshire (GB), AL9 8AA ( * ) Notice: Subject to any disclaimer, the term of this patent is extended or adjusted under 35 U.S.C. 154(b) by 211 days.

(21) Appl. No.: 10/184,242

(22) Filed: Jun. 27, 2002

(65) Prior Publication Data

US 2003/0021875 A1 Jan. 30, 2003

Related U.S. Application Data

(63) Continuation-in-part of application No. 09/645,429, filed on Aug. 24, 2000, now abandoned.

(51) Int. Cl.[7] .............................. A23L 2/52; A23L 2/68
(52) U.S. Cl. ........................ 426/590; 426/610; 426/658
(58) Field of Search ................................ 426/590, 658, 426/810

(56) References Cited

U.S. PATENT DOCUMENTS 4,853,237 A * 8/1989 Prinkkila et al. ........... 426/590

5,114,723 A * 5/1992 Stray-Gundersen ......... 426/590

FOREIGN PATENT DOCUMENTS

JP 402190166 A * 7/1990

* cited by examiner

*Primary Examiner*—Helen Pratt
(74) *Attorney, Agent, or Firm*—John R. Ewbank

(57) ABSTRACT

A proficiency beverage having a pH within the range from about 3.2 to about 3.5, and containing about 7% polyglucose having about nine glucose units per molecule is prepared by a method involving a degradation of starch by enzymes followed by spray drying to prepare a polyglucose powder having an average molecular weight corresponding to about nine glucose units per molecule, preparing a solution of about 0.2 molar citric acid, dispersing such polyglucose in such acidic solution to provide a dispersion containing about 30% of the polyglucose, adding salts, artificial sweeteners, and other flavors to such dispersion, and then diluting with about three parts of water to provide such pH range from 3.2 to about 3.5, said beverage being hypnotic both in the stomach and in the small intestine, thereby rehydrating the body both more quickly and more durably than conventional sports beverages.

2 Claims, No Drawings

PROFICIENCY BEVERAGE

ANCESTOR APPLICATION

This is a continuation-in-part of Ser. No. 09/645,429, of Aug. 24, 2000, now abandoned, and clarifies the method of preparing a preferred embodiment of the invention.

STATEMENT CONCERNING FEDERAL FUNDED RESEARCH AND DEVELOPMENT

Not applicable

MICROFICHE

Not applicable

BACKGROUND OF INVENTION

Proficiency beverages permit an individual to overcome the problems of rehydration after prolonged strenuous exertion.

Prinkkilla et all U.S. Pat. No. 4,853,237 discloses a beverage containing a polyglucose component. Stray-Gunderson U.S. Pat. No. 5,114,723 discloses a wide range of compositions for a proficiency beverage. Kawashima et al Japanes 40290166A discloses a performance beverage containing polyglucose components. Since about 1911, it has been known that the osmotic pressure of solutions of carbohydrates increased as the molecular weight of the carbohydrate increased.

The marketing of the proficiency beverage of the present invention in the UK has involved sufficeint commercial success to timulate the interest of other businesspersons seeking to participate in its marketing. In UK the competive marketers of proficiency beverages have been aware of the uniqueness and superiority of the proficiency beverage of the present invention, but have been unable to "reverse-engineer" this proficiency beverage. Such inability to reverse engineer is attributable to both the unobviousness of the compositon and the unobviousness of the method of preparing such beverage. Rarely is there evidence of market place unobviousness, but when there is evidence of market place unobviousness, such evidence merits weighting with other factors pertinent to unobviousness.

The Mayo Clinic Family Health Book at page 397 explains that: "Make sure you drink water before and after exercise in warm humid weather. If you exercise for a period in excess of 30 minutes, stop and drink water every 15 to 20 minutes during the exercise." Such water helps to cope with the dehydration problems, but does not alleviate the problems of replacing blood sugar and/or salts dealt with by some varieties of sports beverages. When a beverage enters the stomach, there has generally been an "incubation period" so that the body could readjust the composition of the liquid so that it could advance into the intestine, where the absorption of components could occur. In the stomach, some high sugar sports beverages have absorbed liquid from the body in order to be suitable for transmittal to the small intestine. In diluting the sports beverage, the beverage is dehydrating a portion of the body in order to advance the sports beverage into the small intestine for its rehydration function. Such dehydration-rehydration phenomena delay the overall rehydration objective.

How rapidly either the solvent or solute diffuses through a semipermeable membrane is dependent upon a variety of factors. Because glucose is the component in the blood which is needed for energizing further strenuous activity, many sports beverages have heretofore had relatively high concentrations of glucose and/or lower polysaccharides. In the development of the present invention, it was discovered that the speed with which a body adequately re-hydrates and recovers from the dehydration effects of strenuous activity is delayed by such relatively high content of lower saccharides of the sports beverage.

Terms such as "isotonic" and "hypotonic" and "hypertonic" have sometimes been used in connection with the concentration of salts in a liquid, compared to the salt concentration of ocean water or tears or biological fluids. However, these terms are also applicable to the concentration factors affecting absorption through the wall of the small intestine. One feature of the present invention is the use a proficiency beverage designed to be hypotonic both in the stomach and in the small intestine for the purpose of expediting the re-hydration of the individual after prolonged strenuous exercise. This has much to do with maximizing performance after using the beverage, but is less relevant to the thirst-quenching characteristics of a beverage. In order to be marketable, however, the sports beverage must also have a flavor which is sufficiently popular and sufficient thirst-quenching qualities to be utilized. Although the giants in the sports beverage industry have made large profits, the hurdles have been so insurmountable that relatively few new brands of sports beverages have gained any significant share of the competitive market. Market perspectives provided trivial hope that any newcomer might achieve a worthwhile innovation The sports beverage proposed by Winer et al U.S. Pat. No. 4,592,909 aspires for prompt replacement of all of the salts lost in sweat during the hours of strenuous activity. The Winer et al patent criticizes prior art sports beverages because of their high sugar content. The Winer et al sports beverage contains no carbohydrates. Sugar-rich sports beverages continue to dominate the market.

Winer et al explains that the osmotic pressure phenomena influence how long a sports beverage remains in the stomach. Winer et al recommends and claims an osmomolality within a range from 50 to 80 m.osm/liter in order to shorten the residence time in the stomach. Osmomolality is defined as the number of particles per liter.

BRIEF SUMMARY OF THE INVENTION

In accordance with the present invention, a proficiency beverage consists predominantly of water, modified by an edible organic acid such as citric acid for a detectably buffered acidity within the pH range from about 3.2 to about 3.5, and an amount larger than the acid of a polyglucose derived by the hydrolytic degradation of starch. Such proficiency beverage also contains at least some of the modifiers which have conventionally been employed in sports beverages, such as flavors, preservatives, salts, and the like. The proficiency beverage is formulated for achieving hypotonic status both in the stomach and in the early portions of the small intestines for rapid absorption of water into the body [that is re-hydration]. The combination of such hypotonic nature and the pH of about 3.4 assures an extremely brief residence time or incubation time in the stomach. The polyglucosides provide the energy needed for further strenuous activity, but without the side effects of using significant concentrations of sucrose, glucose, and lower glucosides.

The proficiency beverage of the present invention features the use of polyglucosides, that is, polymers resulting from the hydrolytic degradation of starch [usually involving treatment with enzymes] to a product having a molecular weight less than half of the molecular weight of the starch raw material, but predominantly more than triglucosides. Significant energy-supplement is provided without decelerating the speed of rehydration by the body's absorption of the water from the small intestine. The hypotonicity is achieved notwithstanding the inclusion of significant energy food. The beverage of the present invention is hypotonic the stomach and small intestine, thus accelerating the rehydration. The proficiency beverage of the present invention can also contain at least some of the components conventionally included in some sports beverages, such as flavors, sodium chloride, potassium chloride, a biological preservative such as sodium benzoate, and lower saccharides as sweetening flavors, as distinguished from being the principal energizing food component of the beverage. Because some such optional components can affect the pH of the proficiency beverage, different concentrations of citric acid may be needed for achieving the pH range of 3.2 to 3.5 for the proficiency beverage.

DETAILED DESCRIPTION OF THE INVENTION

This invention is concerned with both replenishing energy and expediting the absorption of water because the proficiency beverage is hypotonic in the stomach with respect to the body fluids and is hypotonic with respect to the body fluids on the other side of the wall of the small intestine. Such shortening of the residence time in the stomach and such acceleration of the absorption of the water are achieved partly by the control of hypotonicity, partly by control of the pH, and partly by the use of corn syrup polysaccharides as the principal source for providing food energy from the proficiency beverage. Although minor amounts of sucrose and/or glucose can be included in the proficiency beverage, the weight concentration of such lower glucosides is relatively low compared to the relatively high weight concentration of polyglucosides having a higher molecular weight than tetraglucosides. Although several examples are provided for illustrating a few of the plausible ranges of the concentration of components while still achieving the intended objectives, other variations are plausible, as clarified in the claims.

EXAMPLE 1

A proficiency beverage is characterized by the presence of:

[a] predominantly water;

[b] 0.035% citric acid, thereby providing the edible organic acid needed for achieving the acidity needed for a pH range between pH 3.2 and pH 3.5 in the proficiency beverage;

[c] Corn syrup containing carbohydrates constituting 2.0% of the proficiency beverage. Such carbohydrate concentration is significantly greater than the concentration of the citric acid. Said carbohydrates have a moderate molecular weight because such carbohydrates are prepared by the enzyme treatment of an aqueous dispersion of cornstarch,

[d] 0.5% sucrose, thus being only 25% of the moderate molecular weight polyglucoside; but providing a sweetening effect desirable in achieving a thirst-quenching taste; and

[e] appropriate amounts of conventional components such as a small concentration of sodium citrate as a buffer, preservatives, and flavors.

The performance beverage has a buffered pH within the range from about 3.2 to about 3.5.

Athletes using the resulting proficiency beverage report a more prompt return to feeling as rehydradted as at the first of a game.

EXAMPLE 2

A liter of proficiency beverage is prepared to contain: 3.5 grams of citric acid; 62.5 grams of corn syrup carbohydrates; 5 grams of sucrose; 150 milligrams of sodium benzoate; 680 milligrams of sodium chloride; 350 milligrams of potassium chloride; and 2.6 grams of flavors. Marathon runners deem this to be an acceptable proficiency beverage.

EXAMPLE 3

A proficiency beverage is prepared following the general features of Example 1 but substituting for the corn syrup 4.0% polysaccharide having an average of about 7 glucoside units per molecule and derived by the enzyme treatment of wheat starch. Otherwise the formulation follows that of Example 1. Athletes using the formulation report a feeling of being promptly rehydrated after strenuous exercise.

EXAMPLE 4

A proficiency beverage is prepared consisting predominantly of water and containing 0.9% polyglucose having an average molecular weight of about 9 glucoside groups per molecule, but otherwise generally resembling Example 1. Athletes report it to be a performance beverage superior to those which recently have been most marketed.

EXAMPLE 5

A liter of proficiency beverage is prepared so that it is mainly water containing 400 milligrams of citric acid and 40 grams of a polysaccharide product resulting from the enzyme treatment of corn syrup. This polysaccharide product has about 2% dextrose, about 8% maltose, about 10% maltotriose, and about 80% polyglucose compositions having at least four glucose units, but trivial concentrations of polyglucose components having a molecular weight of starch. Such product has been widely used as a food extender having greater solubility than starch but less solubility than maltose in products such as soups, sauces, seasonings, and meat products.

This solution is modified by the addition of 3 g of sugar. The addition of 150 milligrams of sodium benzoate preservative and 1 gram of sodium citrate buffer modifies the mixture. Small amounts of both sodium and potassium salts are included in this example of a proficiency beverage. Some of the potassium can be provided as an artificial sweetener known as Acesulfame K. By adding 30 milligrams of Acesulfame K and 400 milligrams of potassium chloride, at least a portion of the potassium content of the sweat can be replaced promptly. Similarly, adding 800 milligrams of sodium chloride copes with at least a portion of the loss of sodium through sweat. It can be noted that the salt concentrations are a small fraction of the salt concentrations recommended by Winer et al. U.S. Pat. No. 4,502,909. Appropriate flavors [desirably natural flavors] are added to provide one liter of proficiency beverage having a pH of about 3.4.

The beverage is made available to ironworkers carrying heavy steel beams in the hot sun. The ironworkers who drink such beverage several times per day are able to perform better because the beverage decreases the rate at which any dehydration occurs, and provides energy for strenuous activity. By repeating use of the beverage intermittently during the day, ironworkers can work strenuously in the hot sun without as severe exhaustion as has been the pattern in the past, thus stimulating enthusiasm by ironworkers for the proficiency beverage of the present invention.

EXAMPLE 6

A liter of proficiency beverage is prepared containing about 6 grams of citric acid, about 1.3 grams of sodium citrate, about 80 grams of corn syrup polysaccharides, 5 grams of Sugar 50 milligrams of sodium benzoate, 400 milligrams of sodium chloride, 200 milligrams of potassium chloride, and 300 milligrams of flavors. Racecar drivers using this proficiency beverage before and during prolonged races in hot weather feel more proficient because the strenuous activity is less fatiguing.

EXAMPLE 7

A proficiency beverage is prepared using the relatively high proportion of polyglucose of Example 2, such polyglucose having an average molecular weight corresponding to about nine glucose units, thus resembling Example 4. The polyglucose is prepared by the enzymatic degradation of corn starch followed by spray drying to prepare a solubilized starch. A synthetic sweetener is included in the flavors for the purpose of decreasing the sourness, because the citric acid concentration is high enough to impart to the proficiency beverage a pH within the range from 3.3 to 3.5.

EXAMPLE 8

In order to achieve the significantly advantageous proficiency beverage, it is desirable to employ a combination of characteristics in the final beverage which are not readily achieved by normal mixing procedures, thus making it extremely more difficult to seek to duplicate the beverage merely by analyzing such beverage. The narrow pH range of 3.2 and 3.5 in combination with a relatively high concentration of the degraded starch is optimally obtained using a preferred method of preparation. Normally one would expect to be able to mix all of the ingredients for a short time without any benefits from prolonged mixing. Because the degraded starch is normally used, not in a beverage, but in gravies, soups, and other viscous products, its use in a thin non-viscous performance beverage is unusual. The mixing of the degraded starch thickener into the predominantly aqueous beverage is advantageously achieved by an appropriate method involving relatively prolonged mixing periods.

Although the pH of the proficiency beverage should be in the 3.2 to 3.5 range, the initially prepared solution of citric acid is more strongly acidic. The final concentration of citric acid in the performance beverage is about 0.027 moles per liter. The initial solution of citric acid is about six times as concentrated, because only 150 ml. of spring water are used for dissolving 3.5l[0.02 mole] of anhydrous citric acid. The buffering is slight because the ratio of sodium ions to carboxylic acid groups is about 11 after the addition of 0.07 grams [0.005 mole] of sodium benzoate, functioning also as a preservative for the degraded starch. After the citric acid and sodium benzoate are added, the solution is aged for about ten minutes while working elsewhere with other components. Into this buffered solution is added the 70 grams of the degraded starch, so that this acidic dispersion contains about 30% of the solubilized starch powder having an average molecular weight corresponding to about nine glucoside units per molecule.

Several ingredients are then added to the dispersion of the solubilized starch in the citric acid solution. For example, salts and the flavors, including an artificial sweetener, are added. Then the supplemental water is added in a quantity to make a liter of beverage, stirring for about 20 minutes. A stable beverage containing about 7% degraded starch is thus prepared. This stable beverage has a pH of about 3.3 but does not taste as sour as would be expected for such a low pH because of the action of the artificial sweetener. The usefulness of a performance beverage is significantly affected by its taste, because the dehydrated individual is likely to drink inadequate beverage unless the taste is attractive.

The osmotic pressure of the thus prepared performance beverage is isotonic with respect to both the stomach and the upper intestines, so that the performance beverage is very rapidly adsorbed through the upper intestine walls. The blood can utilize the polyglucoside components of the performance beverage, and store excess polyglucosides as glycogen in the body. Some of the prior art sports beverages have had a high glucose content exceeding the immediate needs of the body for glucose. The attractive effectiveness of the performance beverage of the present invention is believed to be attributable in part to achieving hypotonicity as regards osmotic pressure, as distinguished from hypotonicity as regards salt content or glucose content, and/or other interpretations of hypotonicity.

EXAMPLE 9

An aqueous solution of about 0.2 molar citric acid is modified by the addition of a spray dried powder resulting from the spray-drying of enzyme-degraded corn starch. Such dried powder is a mixture of polyglucose components having an average molecular weight corresponding to about 9 glucose units per molecule, and is generally employed as a "solubilized starch" in the manufacture of soups, gravies, and other products relying upon starch products as thickeners. The amount of the degraded starch thus added to the solution of citric acid is about 40% of the weight of the citric acid solution. Because the citric acid solution is only 0.2 molar, any further degradation of the polyglucose solubilized starch powder does not alter the average molecular weight of the polyglucose outside the range of polyglucose materials of about 9 polyglucose units per molecule. The acidity of the citric acid solution does permit easier dispersion of the polyglucose in the aqueous system. Such dispersion of the polyglucose in the citric acid solution is modified by the addition of flavors, buffers, and related beverage components, including an artificial sweetener. Then additional water in a quantity sufficient to make one liter of beverage having the pH range between 3.3 and 3.5 is added to provide a performance beverage. Notwithstanding the pH of about 3.5, the beverage does not taste excessively sour because of the impact of the artificial sweetener. The stirring during and after the addition of the dilution water should continue for about ten minutes.

The osmalitic pressure of such performance beverage is hypotonic with respect to the body fluids in both the stomach and upper intestines, leading to rapid rehydration of the body of an individual needing rehydration because of extreme exertion.

EXAMPLE 10

Corn starch is subjected to hydrolysis by enzymes to prepare a liquid dispersion suitable for spray-drying. During the spray drying, some supplemental degradation of the starch may occur. The dried powder has an average molecular weight of about nine glucoside units per molecule, but includes some lower polyglucoses and some higher polyglucoses. This dried powder is normally used as a thickener for gravies, soups, as if were a starch which had been modified sufficiently for enhancing its dispersability in water.

Pure food-grade citric acid is dissolved in water to provide a concentration of about 0.2 molar. A dispersion is prepared containing from about 28% to about 35% of such solubilized starch in such acidic solution of citric acid. Such dispersion is allowed to age for about ten minutes, during which some acidic degradation of starch [as distinguished from enzymatic degradation of starch] might occur, without taking the composition outside the average molecular weight range of a polyglucose having about nine glucose units per molecule. Then various modifiers, including artificial sweeteners, are added to the composition. Then about three parts of additional water are added, thereby increasing the pH of the composition to about 3.3 and within the range from 3.2 to 3.4. By reason of the presence of the artificial sweetener, the taste of the performance beverage is not as sour as might be expected with a beverage having such a pH. The osmotic pressure of the performance beverage is hypotonic with respect to body fluids in both the stomach and the upper intestine, whereby the performance beverage stimulates rapid rehydration of a body dehydrated by prolonged exertion.

The invention claimed is:

1. In the method of preparing a proficiency beverage containing water, carbohydrates, and flavors, the improvement which consists of preparing an acidic solution of about 0.2 molar citric acid, dispersing into such relatively concentrated citric acid solution a relatively large amount of polyglucose having an average molecular weight of about 9 glycoside units per molecule, allowing such aqueous dispersion of citric acid and such polyglucose to age for at least ten minutes, adding an artificial sweetener, modifying salts, and other flavors to such acidic dispersion, adding several parts of water while stirring for at least ten minutes to prepare a proficiency beverage having a pH within the range from 3.2 to 3.5, said beverage not having the sourness to be expected from a beverage having such an acidic pH by reason of such artificial sweetener.

2. The method of claim 1 in which the polyglucose is prepared by enzyme degradation of corn starch followed by spray drying to prepare a polyglucose having an average molecular weight of about 9 glucose units put molecule for preparing a powder suitable as a soluble starch suitable for thickening viscous foods.

* * * * *